Nov. 14, 1967  E. L. FISCHER  3,352,495

NOZZLE CONSTRUCTION

Filed Jan. 29, 1965

INVENTOR
EDWARD L. FISCHER
BY
Curtis, Morris & Safford
ATTORNEYS

United States Patent Office 3,352,495
Patented Nov. 14, 1967

3,352,495
NOZZLE CONSTRUCTION
Edward L. Fischer, Kinnelon, N.J., assignor to Thiokol Chemical Corporation, Bristol, Pa., a corporation of Delaware
Filed Jan. 29, 1965, Ser. No. 428,989
1 Claim. (Cl. 239—265.15)

The present invention relates to jet engines and more particularly to an improved nozzle construction for such engines.

One of the difficulties in designing a nozzle for a rocket engine is to provide a structure which will produce good performance at all altitudes. If the nozzle is designed with low area ratio (exit area divided by throat area) it will produce a maximum thrust at low altitudes, only. On the other hand, if the nozzle is designed with a high area ratio it will produce a minimum thrust at low altitudes, but a maximum thrust at high altitudes. Thus, maximum performance of the rocket engine must be sacrificed at one or the other extremes of altitude and conventional designs are a compromise to obtain the best average performance at all altitudes.

One of the objects of the present invention is to provide an improved method of and nozzle construction for producing a maximum thrust at all altitudes.

Another object is to progressively increase the area ratio of the nozzle of a jet engine at a rate functionally related to increases in altitude.

Still another object is to provide an improved nozzle construction which is of simple and compact construction, economical to manufacture and one which is reliable in operation.

These and other objects will become more apparent from the following description and drawing in which like reference characters denote like parts throughout the several views. It is to be expressly understood, however, that the drawing is for the purpose of illustration only and not a definition of the invention, reference being had for this purpose to the appended claim.

Figure 2:
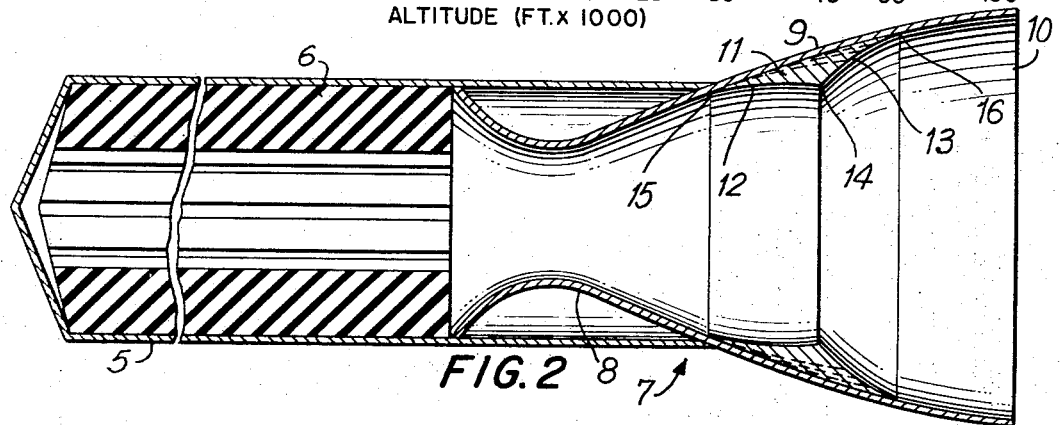
FIGURE 2 is a sectional view longitudinally of a rocket engine and showing a ring of ablative material on the inside of the nozzle wall for initially producing a low nozzle area ratio.
Figure 3:
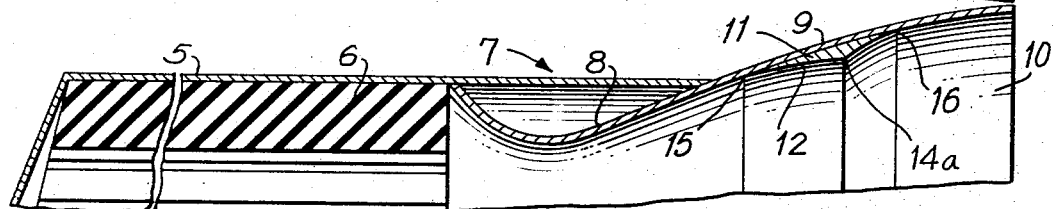
Figure 4:
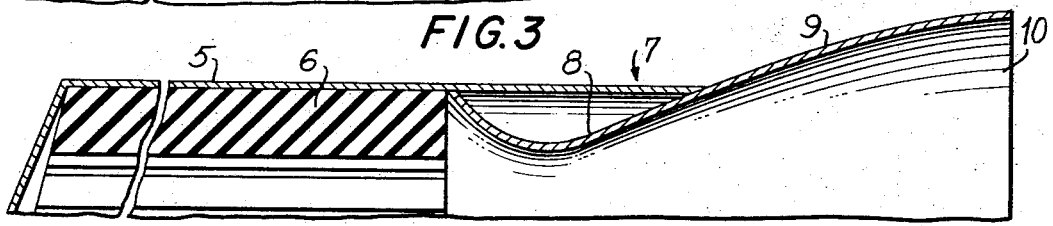

FIGURE 3 is a sectional view, similar to FIGURE 2, of the upper half of the rocket engine nozzle and showing a portion of the ablative material eroded away by the jet of hot gases flowing over its surface to increase the nozzle area ratio; and FIGURE 4 is a view similar to FIGURE 3 showing the entire ring of ablative material removed by the action of the jet gases to produce a maximum area ratio for high altitudes.

Figure 1:
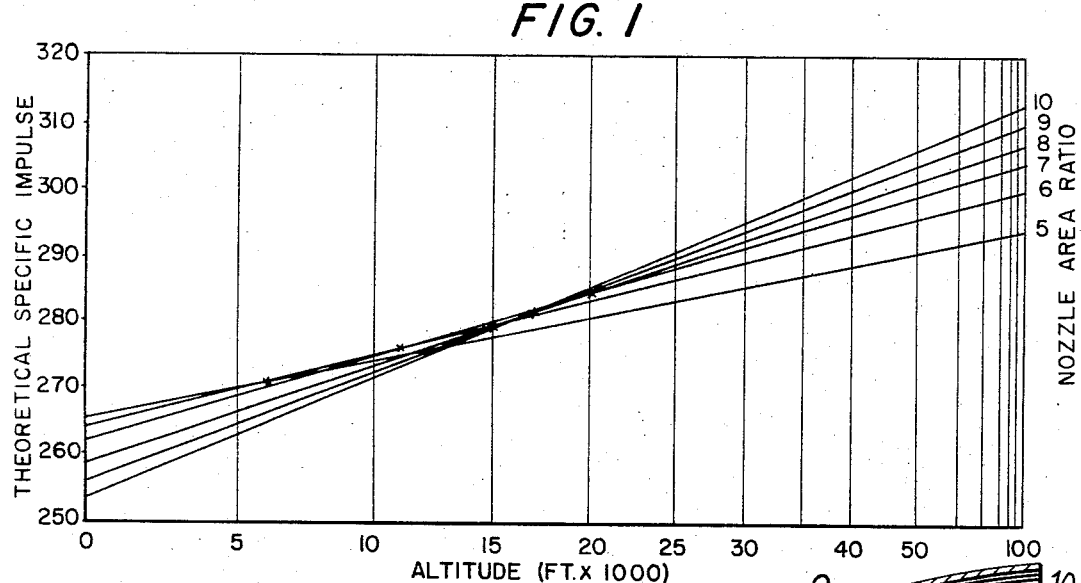
FIGURE 1 is a chart showing the relation of specific impulse to altitude for nozzles having different nozzle area ratios.

The method of the present invention comprises applying an annulus of ablative material on the inside of the nozzle wall of a jet engine to produce a minimum area ratio, and then gradually removing the ablative material by the erosive action of the hot gases of the jet during operation of the engine. Such erosion of the ring of ablative material gradually increases the exit area and thereby the area ratio of the nozzle at a rate functionally related to time and increases in altitude of the rocket engine. As shown in FIGURE 1 of the drawing, a low area ratio of 5 will produce the greatest impulse at sea level and up to altitudes of approximately 6,000 feet. At the opposite extreme, a high area ratio of 10 produces a much lower impulse up to approximately 13,000 feet and a greater impulse above 20,000. Thus, it will be seen that at zero altitude above sea level, a low area ratio is desirable, but at higher altitudes a higher area ratio is desirable and that this improvement in performance is proportional to the area ratio.

In accordance with the method of the present invention, the ring of ablative material is attached to the inside of the nozzle wall between the throat and exit end. The ring has a wave shape formed by intersecting curved surfaces to provide an apex radially inward from the wall and constituting the exit area of the nozzle. Thus, at a minimum altitude on the ground where the rocket engine is to be fired, the ring of ablative material will produce a minimum nozzle area ratio (exit area divided by throat area) to produce a maximum thrust. As the ablative material is eroded from its curved surface nearest the throat which is impinged by the hot gases of the jet, a new apex is formed closer to the wall of the nozzle and more remote from the throat. This new surface and apex, in turn, will produce a greater area ratio, and thereby produce a greater impulse. As the rocket engine rises during the time that the ring is being ablated at a rate proportional to time, the area ratio increases at a rate functionally related to increases in altitude.

It will further be observed by the reference to FIGURE 1 that the lines indicating impulse versus altitude for successive increases in area ratios all rise from left to right showing an increase in impulse with increases in altitude, but that the lines representing successively higher area ratios increase the specific impulse with increases in altitude at a greater rate. Actually the lines all cross between 6,000 and 20,000 feet of altitude so that the smallest area ratio should be used below 6,000 feet and the highest area ratio should be used above 20,000 feet with progressively increasing area ratios therebetween. In accordance with the present invention, the surface of the ablative material is removed at a rate proportional to, or at least functionally related to, increases in the altitude of the rocket engine.

The invention, therefore, includes the additional step of selecting an ablative material which will erode away at a rate with respect to time corresponding to increases in altitude of the rocket engine as it moves in its planned trajectory so that a maximum impulse will be produced at all altitudes as indicated by the plotted lines in FIGURE 1. To this end, materials such as synthetic resins may be selected either with or without reinforcing materials such as organic or inorganic fibers depending upon whether a rapidly eroding or slowly eroding material is required for the rate of climb of the particular rocket engine. These materials may include phenolic resins, graphite, high melting temperature silicates, tri-ester polymers and silicons with or without reinforcing fibers of from 52% to 72% Refrasil, fiberglass, quartz, asbestos or other fillers such as metallic oxides, ceramics, etc. It has been found that by selecting materials which will ablate at the rate required for a particular trajectory, as determined by test, that the specific impulse of the jet engine can be maintained at a maximum throughout the flight of the rocket engine.

Referring now to FIGURE 2 of the drawing, it will be observed that the rocket engine comprises a casing 5 containing, for example, a solid propellant grain 6 and having a nozzle 7 at its rearward end. The wall 9 of the nozzle 7 is so formed as to provide a throat 8 and a diverging diffuser constituting an exit 10 at its outer end. This nozzle has a high area ratio of, for example, 10 as illustrated in the chart in FIGURE 1 for producing a maximum impulse or thrust for a particular rocket engine at altitudes above 20,000 feet. In accordance with the present invention, a ring 11 of ablative material is attached to the wall 9 between the throat 8 and the outlet end 10, as shown in FIGURE 1. Ring 11 of ablative material has a wave shape formed by the intersection of the curved surfaces 12 and 13 with each other to form the annular apex 14 projecting inwardly from the wall 9 between the ends 15 and 16 of the ring. Thus, the annular apex 14 forms a temporary exit area positioned radially inward from the wall 9 of the nozzle and which controls the flow of hot jet gases from the rocket engine. The temporary exit formed by the apex 14 of the ring 11 has an area considerably smaller than the area 10 at the rearward end of the nozzle to produce a low area ratio of, for example 5. Thus, the rocket engine nozzle 7 will initially have the thrust characteristics indicated by the line for area ratio 5 in FIGURE 1 with a maximum impulse at low altitude.

FIGURE 3 shows the upper half of the rocket engine illustrated in FIGURE 2 but with the ablative material eroded away by the action of the jet gases to produce an area ratio of 6. It will be observed that the apex 14a of the ring 11 is then located radially outward and rearwardly from the apex in FIGURE 2 to increase the exit area and area ratio of the nozzle. FIGURE 5, on the other hand, shows the entire ring 11 of ablative material completely eroded away so that the jet gases will escape from the exit end 10 of the nozzle 7 and produce an area ratio of 10. The successive increases in the diameter and location of the apex 14 of ring 11 as the ablative material is eroded away to produce successive area ratios of 6 to 9 are illustrated by dotted lines in FIGURE 2. As stated above with respect to the method, the ring 11 may be formed of any suitable material including any of the following materials with or without reinforcing fibers to produce a rate of erosion in a particular nozzle 7 in accordance with requirements. For example, the ring 11 may comprise any of the following materials:

(a) Phenolic resins reinforced with glass organic fiber
    Phenolic-Refrasil—28% resin content
    Phenolic-Refrasil—48% resin content
    Phenolic-Fiberglas—25% resin content
    Phenolic-Quartz—Durex
(b) Graphite
(c) Haveg Rocketon ⎫ High melting silicate with an or-
(d) Havey Missileon ⎭ ganic binder.
(e) Raybestos Manhattan 150 RPD (asbestos-phenolic)
    ⎫ With and without reinforcements
(f) Tri-ester polymers ⎬ such as glass, asbestos, quartz,
(g) Silicones ⎭ graphite, metallic oxides, ceramics, etc.

The nozzle 7 is designed for the particular rocket engine with which it is to be used taking into consideration the particular mission on which the rocket engine is to be used and its rate of climb. An ablative material is then selected which will erode under the action of the hot jet gases in the particular engine at a rate corresponding to increases in its altitude. The ablative material is then formed into a ring 11 having a wave shape compatible with the particular shape of the nozzle wall 9 and the ring is attached thereto.

When the propellant grain 6 of the rocket engine is ignited, it produces gases at a particular pressure and temperature that flow through the nozzle 7 and produces a thrust or impulse to propel the engine. Due to ring 11 of ablative material on the inside of the wall 9 of the nozzle, the area ratio will produce a maximum impulse of thrust at the altitude from which the rocket is initially fired. As the rocket engine 5 continues to move into space the flow of hot jet gases over the curved surface 12 of ring 11 produces an ablation or erosion of the material to shift the apex from the location 14 in FIGURE 2 to the location 14a as illustrated in FIGURE 3. By selection of the proper ablative material which will erode at a rate corresponding to the time required for increases in altitude, it is possible to progressively increase the area ratio and produce a maximum thrust at each altitude as indicated by the chart in FIGURE 1. The erosive action of the ablative material continues during the flight of the rocket engine until the entire ring 11 has been eroded away, as shown in FIGURE 4, to produce a maximum area ratio at the higher altitudes.

It will now be observed that the present invention provides an improved method of and nozzle construction for maintaining a maximum thrust at increasing altitudes. It will further be observed that the present invention varies the area ratio of the nozzle of a jet engine with increases in altitude. It will still further be observed that the present invention provides an improved nozzle construction which is of simple and compact construction, economical to manufacture and one which is reliable in operation.

While a single embodiment of the invention is herein illustrated and described, it will be understood that changes may be made in the structure and arrangement of elements without departing from the spirit or scope of the invention. Therefore, without limitation in this respect, the invention is defined by the following claim.

I claim:

A variable nozzle for a rocket engine in which a propellant is burned to produce a jet of hot gases comprising a wall forming a throat with a large exit area, said nozzle having a maximum area ratio, consisting of the exit area divided by throat area, required for best operation of the rocket engine at high altitudes, a ring attached to said nozzle wall remotely from said throat to produce a minimum area ratio required at low altitudes, said ring being composed of an ablative material which will be eroded by the hot gases of the jet at a predetermined rate, and said ring of ablative material having a wave shape formed by intersecting curved surfaces adjacent to and remote from the throat for producing an apex positioned inwardly from the wall of the nozzle which progressively increases in diameter as the ablative material erodes while maintaining its wave shape.

References Cited

UNITED STATES PATENTS

| | | | |
|---|---|---|---|
| 3,079,752 | 3/1963 | Thielman | 239—265.15 |
| 3,135,297 | 6/1964 | Nordberg et al. | 60—35.6 |
| 3,210,233 | 10/1965 | Kummer et al. | |
| 3,235,183 | 2/1966 | Osborn et al. | 239—265.15 |
| 3,237,402 | 3/1966 | Steverding | 60—35.6 |
| 3,253,403 | 5/1966 | Hayes | 60—35.6 |

M. HENSON WOOD, Jr., *Primary Examiner.*

V. C. WILKS, *Assistant Examiner.*